(12) United States Patent
Jones (10) Patent No.: US 9,837,770 B2
(45) Date of Patent: Dec. 5, 2017

(54) FUSIBLE LINK CABLE HARNESS AND SYSTEMS AND METHODS FOR ADDRESSING FUSIBLE LINK CABLE HARNESSES

(71) Applicant: HONEYWELL INTERNATIONAL INC., Morristown, NJ (US)

(72) Inventor: Doyle Jones, Plametto, FL (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 187 days.

(21) Appl. No.: 14/552,810

(22) Filed: Nov. 25, 2014

(65) Prior Publication Data

US 2016/0149351 A1    May 26, 2016

(51) Int. Cl.
| | | |
|---|---|---|
| *H02B 1/20* | (2006.01) |
| *H01R 13/70* | (2006.01) |
| *H01R 13/68* | (2011.01) |
| *H01R 13/66* | (2006.01) |
| *H01H 85/46* | (2006.01) |
| *H01R 31/06* | (2006.01) |
| *B60R 16/02* | (2006.01) |

(52) U.S. Cl.
CPC ............ *H01R 13/70* (2013.01); *H01H 85/46* (2013.01); *H01R 13/6675* (2013.01); *H01R 13/6691* (2013.01); *H01R 13/68* (2013.01); *H01R 31/065* (2013.01); *B60R 16/0207* (2013.01); *H01R 2201/26* (2013.01)

(58) Field of Classification Search
CPC .......... H02B 1/202; H04Q 1/14; H01R 13/70; H01R 2201/26; H01R 13/6675; H01R 13/6691; H01R 13/68; H01R 31/065; H01H 85/46; B60R 16/0207
See application file for complete search history.

(56) References Cited

U.S. PATENT DOCUMENTS 3,699,395 A * 10/1972 Boleky ................. G11C 17/16
148/DIG. 122
4,720,915 A   1/1988 Kennedy et al.
4,897,047 A * 1/1990 Connell ................ H01R 29/00
337/256

(Continued)

FOREIGN PATENT DOCUMENTS

WO    2006049614 A1    5/2006

OTHER PUBLICATIONS

Adafruit Products; Adafruit 1-Wire Thermocouple Amplifier—MAX31850K—Pinouts; Feb. 26, 2014.

(Continued)

*Primary Examiner* — Robert J Hoffberg
*Assistant Examiner* — Hung Dang
(74) *Attorney, Agent, or Firm* — Lorenz & Kopf, LLP (57) ABSTRACT

A fusible link cable harness and systems and methods for addressing fusible link cable harnesses are provided. The fusible link cable harness, for example, may include, but is not limited to, a first connector having a plurality of pins, the plurality of pins comprising a main addressing pin and a plurality of secondary addressing pins, and a fusible link board, the fusible link board including, but not limited to, a bus coupled to the main addressing pin, and a plurality of fusible links, each of the plurality of fusible links coupled between one of the secondary addressing pins and the bus.

11 Claims, 6 Drawing Sheets

(56) References Cited

U.S. PATENT DOCUMENTS

5,455,734 A     10/1995  Foreman et al.
5,917,229 A      6/1999  Nathan et al.
6,008,523 A  *  12/1999  Narayan ............. H01L 23/5256
                                                          257/209
6,449,170 B1 *   9/2002  Nguyen .............. H01L 23/5382
                                                          257/209

OTHER PUBLICATIONS

Extended EP Search Report for Application No. 15195741.2-1801 dated Oct. 5, 2016.
EP Examination Report for Application No. 15195741.2 dated Oct. 6, 2017.

* cited by examiner

FUSIBLE LINK CABLE HARNESS AND SYSTEMS AND METHODS FOR ADDRESSING FUSIBLE LINK CABLE HARNESSES

TECHNICAL FIELD

The present disclosure generally relates to cables, and more particularly relates to addressing cables in line replaceable unit environments.

BACKGROUND

Aircraft and other specialized systems often utilize line replaceable unit systems. Line replaceable unit systems utilize modular components (i.e., line replaceable units) so that equipment that is experiencing a fault or is scheduled to be upgraded can be easily changed. However, addressing each line replaceable unit can be time consuming.

BRIEF SUMMARY

In one embodiment, for example, a fusible link cable harnesses is provided, The fusible link cable harnesses may include, but is not limited to, a first connector having a plurality of pins, the plurality of pins comprising a main addressing pin and a plurality of secondary addressing pins, and a fusible link board, the fusible link board including, but not limited to, a bus coupled to the main addressing pin, and a plurality of fusible links, each of the plurality of fusible links coupled between one of the secondary addressing pins and the bus.

In another embodiment, an ID burning device is provided. The ID burning device may include, but is not limited to, a connector configured to receive a fusible link cable harnesses having a fusible link board, the connector having a plurality of pins, a plurality of switches, each of the plurality of switches selectably connected to one of the plurality of pins, and a power supply electrically coupled to the plurality of switches, the power supply configured to output a predefined current to the switches which are selected to be coupled to a respective on of the plurality of pins, the predefined current being greater than a current threshold of a fusible link on the fusible link board.

In yet another embodiment, a method for assigning an address to a received fusible link cable harness is provided. The method may include, but is not limited to, receiving, by a controller, one of an address or a switch selection, connecting, by the controller, a power supply to fusible links of the received fusible link cable harness via a plurality of switches according to the received one of the address or the switch selection, and applying, by the power supply, a current above a current threshold of the fusible links of the received fusible link cable harness to assign the address to the fusible link cable harness.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, a fusible link cable harness is provided. The fusible link cable harness can be used to connect a line replaceable unit to a central interface unit in various environments. As discussed in further detail below, the fusible link cable harness includes fusible links coupled to certain pins of the fusible link cable harness. By simply applying a current to some of the fusible links, an address and or a configurable option can be assigned to the fusible link cable harness such that a line replaceable unit coupled to the fusible link cable harness can be addressed or have configurable options selected.

Figure 1:
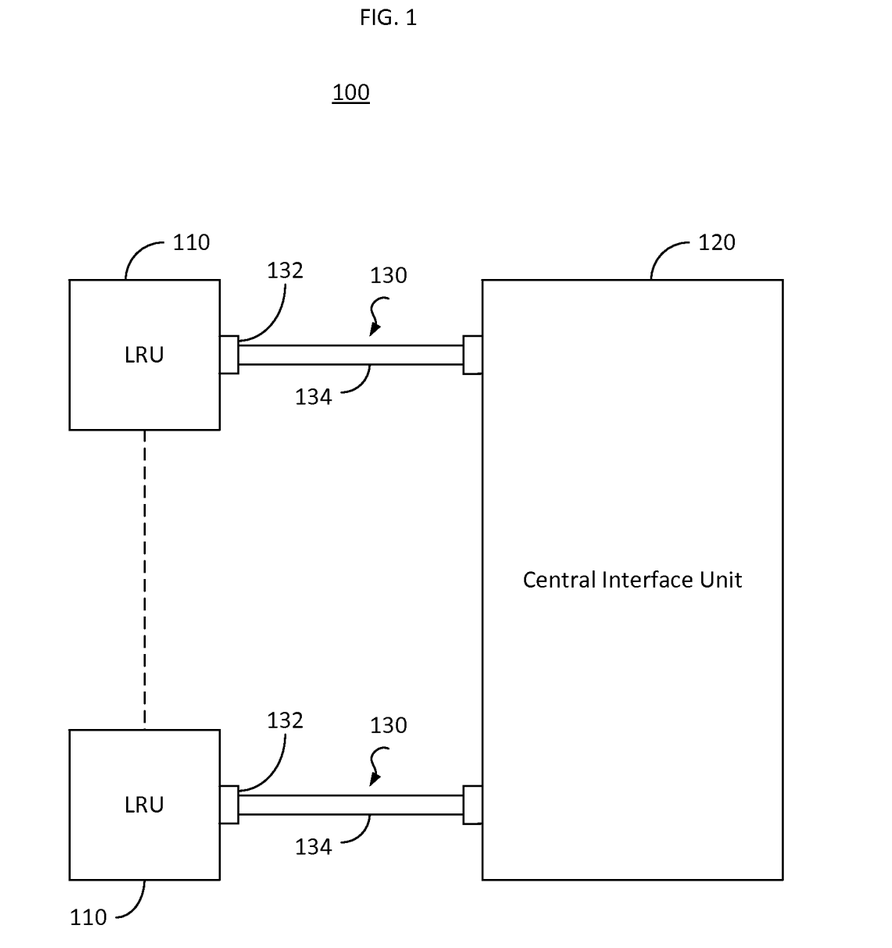
FIG. 1 is a block diagram of a line replaceable unit system, in accordance with an embodiment.

FIG. 1 is a block diagram of a line replaceable unit system 100, in accordance with an embodiment. In one embodiment, for example, the line replaceable unit system 100 may be part of an aircraft, watercraft or spacecraft. However, one of ordinary skill in the art would recognize that the line replaceable unit system 100 may be implemented in any operation environment, including, but not limited to, vehicular settings, commercial settings or industrial settings.

The line replaceable unit system 100 includes multiple line replaceable units (LRU's) 110. Each LRU 110 is a modular component designed to be replaced quickly in the operating environment. In an aircraft setting, for example, an LRU 110 may be part of an in-flight entertainment system, such as a Blu-ray player, an in seat display or overhead display, a network switch, or the like. The LRU 110 could also be a radio or other auxiliary equipment in a vehicle. The LRU 110 could also be a configurable device that once configured via a fusible link would operate to an assigned task. In other words, the LRU 110 may be capable of performing multiple tasks or offering multiple services and can be programmed to execute a subset of the tasks and/or offer a subset of the services based upon an address assigned to the LRU 110, as discussed in further detail below.

Each LRU 110 is coupled to a central interface unit (CIU) 120. The CIU 120 coordinates communication with each LRU 110 with other components, such as a processor or a controller, in the operation environment of the line replaceable unit system 100. As the LRU's 110 are designed to be easily replaceable to minimize downtime of the operating environment, the LRU's 110 do not have unique addresses associated with themselves. Typical CIU's 120 will direct a command to a LRU 110 based upon an address associated with a handmade cable harness coupled between the LRU 110 and the CIU 120. However, the handmade cables harnesses are costly to make and time consuming to replace. Accordingly, the line replaceable unit system 100 illustrated in FIG. 1 utilizes a fusible link cable harness 130 to connect the LRU's to the CIU 120.

The fusible link cable harness 130 includes a connector housing 132 and a cable 134. The connector housing 132 includes the connector for connecting the fusible link cable harness 130 to a LRU 110 and the CIU 120. In one embodiment, for example, the connector housing 132 may be a 25-pin D-sub cable connector. However, one of ordinary skill in the art would recognize that a variety of different connection types and configurations could be used. The connector housing 132 further includes a fusible link board (not illustrated in FIG. 1) for assigning an address to the fusible link cable harness 130. The LRU 110 will be addressed by the fusible link cable harness 130 by reading an address from one or more pins in the connector housing 132, as discussed in further detail below.

Figure 2:
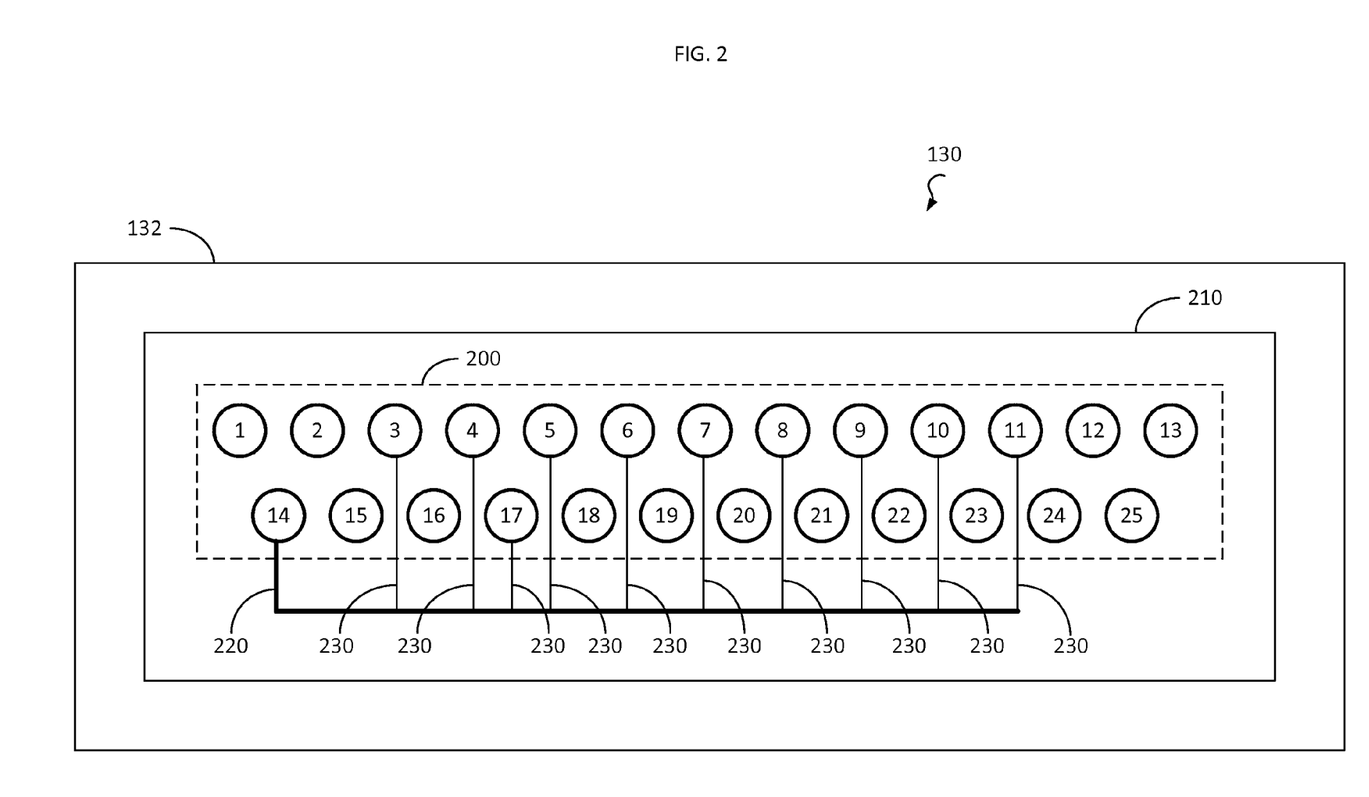
FIG. 2 is an end view of an exemplary connector housing for a fusible link cable harness, in accordance with an embodiment.

FIG. 2 is an end view of an exemplary connector housing 132 for a fusible link cable harness 130, in accordance with an embodiment. The connector housing 132 includes a connector 200. In the embodiment illustrated in FIG. 2, the connector 200 is a 25-pin D-sub connector. However, as discussed above, the number of pins and the configuration of the connector can vary. In one embodiment, for example, only a subset of the pins, labeled 1-25, are connected to a small printed circuit board inside the connector.

Figure 3:
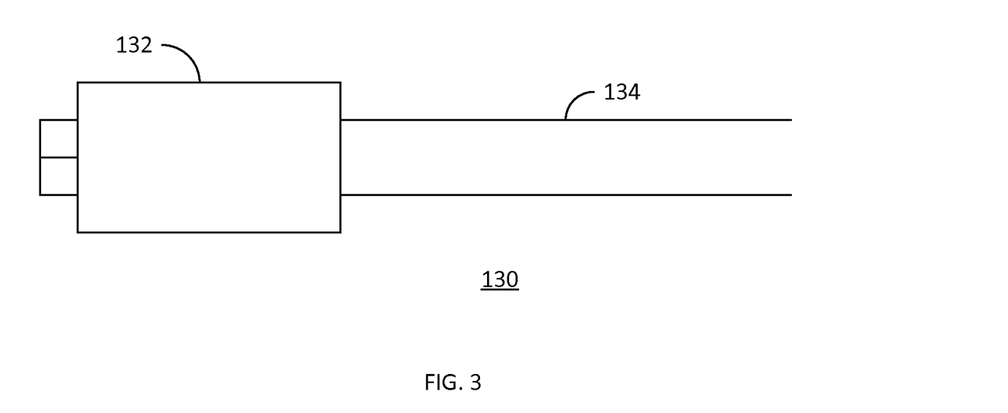
FIG. 3 illustrates an exemplary straight through style connector housing, in accordance with an embodiment.
Figure 4:
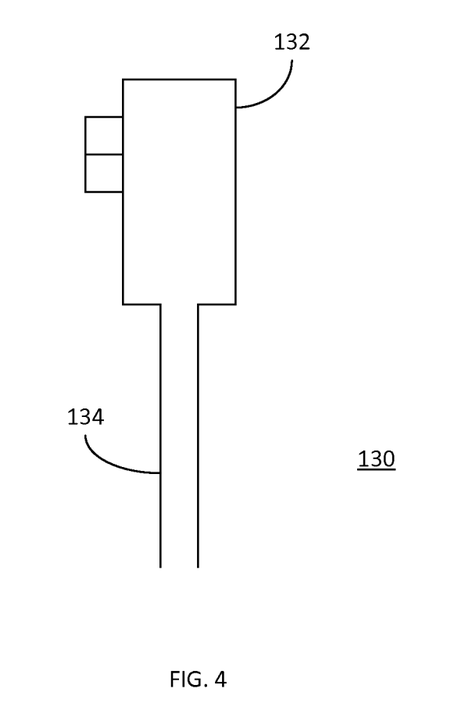
FIG. 4 illustrates an exemplary right angle style connector housing, in accordance with an embodiment.

In one embodiment, for example, the connector housing 132 may be a straight through style connector where the cable 134 exits a back of the connector housing 132. FIG. 3 illustrates an exemplary straight through style connector housing 132. However, one of ordinary skill in the art would recognize that the proportions and features of the connector housing 132 can vary. In another embodiment, for example, the connector housing 132 may be a right angle style connector where the cable 134 exits from the bottom or top of the connector, the cable could also exit to the right or left of the housing 132. FIG. 4 illustrates an exemplary right angle style connector housing 132, in accordance with an embodiment. However, one of ordinary skill in the art would recognize that the proportions and features of the connector housing 132 can vary.

Returning to FIG. 2, the connector housing 132 further includes a fusible link board 210. In various embodiments, for example, the fusible link board 210 may be a flexible or a rigid printed circuit board (PCB). While the fusible link board 210 is illustrated as being in a plane parallel to the face of the connector 200, one of ordinary skill in the art would recognize that the respective orientations of the fusible link board 210 and connector 200 could vary.

The fusible link board 210 is connected to a subset of the pins of the connector 200. The subset of pins are used as addressing pins for assigning an address to the fusible link cable harness 130, however this subset of pins could also be used to assign a functional configuration to the LRU 110. In the embodiment illustrated in FIG. 2, the fusible link board 210 connects pins 3-11, 14 and 17. However, one of ordinary skill in the art would understand that the assignment of pins and the number of pins used as addressing pins can vary.

In the embodiment illustrated in FIG. 2, pin 14 is assigned as the main addressing pin. The other addressing pins (i.e., pins 3-11 and 17) are assigned as secondary addressing pins. The LRU 110 determines the address associated with the fusible link cable harness 130 based upon a determination of which of the secondary addressing pins are resistively coupled to the main addressing pin. In one embodiment, for example, if a secondary addressing pin is connected to the main addressing pin, the LRU 110 will associate a one with the respective pin and if the secondary addressing pin is not connected to the main addressing pin the LRU 110 will associate a zero with the respective pin. In another embodiment, for example, if a secondary addressing pin is connected to the main addressing pin, the LRU 110 will associate a zero with the respective pin and if the secondary addressing pin is not connected to the main addressing pin the LRU 110 will associate a one with the respective pin.

In one embodiment, for example, an Ovation Select addressing system may use an eleven bit binary address. The LRU 110 may have an internal pull up resistor connected to each of the eleven address pins in the connector, for example, pins 3-11 and 17. Pin 14, for example on the LRU 110 is at a ground potential so that if it is connected to any of the address lines the binary bit for that position will be a "0" if it is not connected to that position the LRU internal pull up resistors will hold the binary bit up to be read as a "1". In one embodiment, for example, the CIU 120 send the same commands to every port. The LRU 110 determines which commands to execute based upon addresses associated with the commands. Furthermore, the LRU 110 can add its address, which is based upon the address associated with the fusible link cable harness 130, to data sent to the CIU 120 so that the CIU can determine where the data came from.

The fusible link board 210 includes a bus 220. The bus 220 is connected to the main addressing pin, in this example, pin 14. In one embodiment, for example, the bus 220 is a trace on the fusible link board 210 having a predetermined thickness. Each of the secondary addressing pins are connected to the first bus 220 through fusible links 230. The fusible links 230 are designed to pass electrical current below a predetermined amperage (i.e., a current threshold) and to permanently open (i.e., burn out) in response to receiving the current above the predetermined amperage. In one embodiment, for example, the fusible links 230 may be traces thinner than the thickness of the first bus 220, as discussed in further detail below. Traditional fuses are typically too large and switches tend to fail in high vibration and temperature environments. Accordingly, by utilizing traces of different sizes on a small printed circuit board, a permanent and easy solution to produce an address or configuration selection mechanism is achieved.

In order to assign an address to the fusible link cable harness 130, some of the fusible links 230 are purposefully broken. In one embodiment, for example, a current may be applied to a selected subset of the addressing pins to break selected fusible links 230. In this embodiment, for example, the bus 220 may be a trace which is 2mm wide on the fusible link board 210 while the fusible links may be a trace which is less than around 0.5mm thick. However, one of ordinary skill in the art would recognize that the width of the traces designed to be fusible (i.e., the fusible links 230) and the width of the traces designed not to be fusible (i.e., the bus 220) can vary depending upon the current applied to break the fusible links 230. The materials of the traces of the bus 220 and the fusible links 230 could also vary. In one embodiment, for example, the traces of the bus and/or fusible links 230 could be made of tin plating. In other embodiments, for example, the traces of the busand/or fusible links 230 could be made of copper clad, or other materials depending on the severity of the intended environments.

Figure 5:
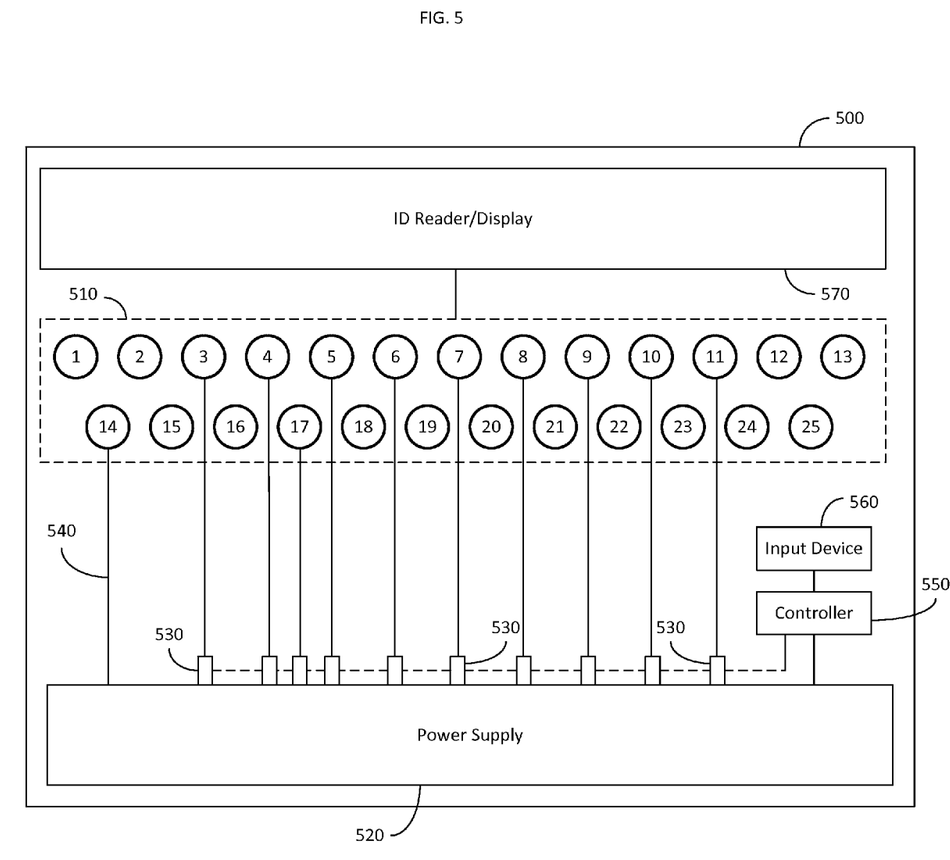
FIG. 5 is a block diagram of an ID burning device, in accordance with an embodiment.

FIG. 5 is a block diagram of an ID burning device 500, in accordance with an embodiment. The ID burning device 500 could be, for example, a portable device or could be situated in a workstation. The ID burning device 500 includes at least one connector 510 corresponding to the connector 200 of the fusible link cable harness 130. In the embodiment illustrated in FIG. 3, the connector 510 is a twenty-five pin D-sub connector. However, the connector 510 can vary depending upon the expected connector 510 of the fusible link cable harness 130. In one embodiment, for example, the ID burning device 500 may have multiple connectors 510 for different styles of fusible link cable harnesses 130. In another embodiment, for example, the ID burning device 500 may have an interchangeable connector 510 which can be switched out according to the fusible link cable harness 130 to be programed.

The ID burning device 500 further includes a power supply 520. As discussed above, the power supply 520 applies a current to selected addressing pins of the fusible link cable harness 130. In one embodiment, for example, the ID burning device 500 may include multiple switches 530. Each of the switches 530 may be coupled between the power supply 520 and a pin of the connector 510. Accordingly, a user of the ID burning device 500 can assign an address to a fusible link cable harness 130 coupled to the connector 510 by opening and/or closing the switches 530. In this embodiment, for example, all of the selected address pins could receive the programming current simultaneously. However, in other embodiments, the ID burning device 500 may only have a single switch 530 which is movable between the pins of the connector 510. In this embodiment, the power supply 520 would assign an address bit to each fusible link 230 individually.

The amperage output by the power supply 520 can be selected such that the fusible links 230 of the fusible link cable harness 130 would be opened when connected to the power supply 520 without damaging the bus 220. In other words, the amperage output by the power supply 520 would disconnect the selected secondary address pins of the fusible link cable harness 130 from the main address pin by applying a current above a current threshold of a respective fusible link 230, thereby assigning the address to the fusible link cable harness 130, without damaging other components in the fusible link cable harness 130. A return line 540 coupled between pin 14 of the connector 510 and the power supply 520 completes the circuit. In one embodiment, for example, the power supply 520 may output a five amp signal. In one embodiment, for example, a straight DC amperage should be sufficient to break a fusible link 230 made from, for example, copper clad. However, if other metals or alloys are used for the fusible links 230 for more extreme environments, other methods, including AC may prove better for breaking a fusible link 230. In other words, the amperage and type of waveform (AC, DC, square wave, etc.) can vary depending upon the respective current threshold of the bus 220, the material used to form the fusible links 230 and any other components of the fusible link cable harness 130.

In one embodiment, for example, the switches 530 may be manually operated by a user. In other words, a technician would be able to manually couple or decouple the pins of the connector 510 by opening or closing a respective switch. In another embodiment, for example, the switches 530 may be operable by a controller 550. The controller 550 may include a processor, such as a central processing unit (CPU), a microcontroller, an application specific integrated circuit (ASIC), a field programmable gate array (FPGA), or any other logic device or combination thereof. The controller 550 may selectively open and close the switches 530 based upon input from an input device 560. The input device 560 may be, for example, a keyboard, a touch screen, a mouse, a display, or the like, or any combination thereof. In one embodiment, for example, an operator of the ID burning device 500 could either enter an address to the controller 550 through an input device 560. The controller 550 would then determine which of the switches 530 to open and close in order the implement the address burn-in via the power supply 520. In another embodiment, for example, an operator could simply select which switches 530 to open or close through the input device 560. The controller 550 could also be coupled to the power supply 520. In this embodiment, for example, the controller 550 may determine when to activate the power supply 520 to output the programming current. The controller 550 may automatically activate the power supply 520 after controlling the switches 530 based upon input the switch selection or address selection from the input device 560, or may activate the power supply 520 after receiving a specific activation command through the input device 560.

In one embodiment, for example, the ID burning device 500 may further include an ID reader 570. The ID reader 570 may be configured to read the address from a fusible link cable harness 130 in the same manner as the LRU 110 to verify that the address assigned to the fusible link cable harness 130 was correctly assigned. In one embodiment, for example, the ID reader 570 may be coupled to the same connector 510 used to assigned the address to the fusible link cable harness 130. However, in other embodiments, the ID reader 570 may utilize a different connector (not illustrated). In one embodiment, for example, the ID reader 570 could include a display for outputting the address assigned to the fusible link cable harnesses 130. The display could be an LCD display, an OLED display, or any other display capable of displaying the address.

Figure 6:
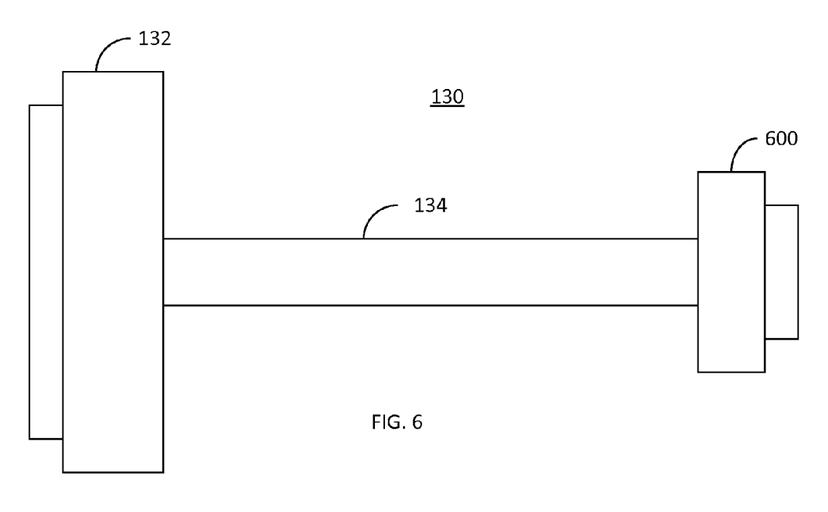
FIG. 6 illustrates another exemplary fusible link cable harness in accordance with an embodiment.

FIG. 6 illustrates another exemplary fusible link cable harness 130 in accordance with an embodiment. In this embodiment, the fusible link cable harness 130 includes a connector housing 132 as discussed above on one side of a cable 134 and a second connector housing 600 on a second side of the cable 134. In one embodiment, for example, the second connector housing 600 may be a 9-pin D-sub connector. As multiple pins in the connector housing 132 are used solely to address the fusible link cable harness 130, the pins are not used to transfer data between the LRU 110 and the CIU 120. Accordingly, only a subset of the pins of the connector housing 132 would be required to be connected to the second connector housing 600. One advantage of this embodiment is that any LRU 110 connected in this manner would only require smaller (e.g., a 9-pin D-sub connector) connector, reducing the size, weight and cost of the LRU 110.

Figure 7:
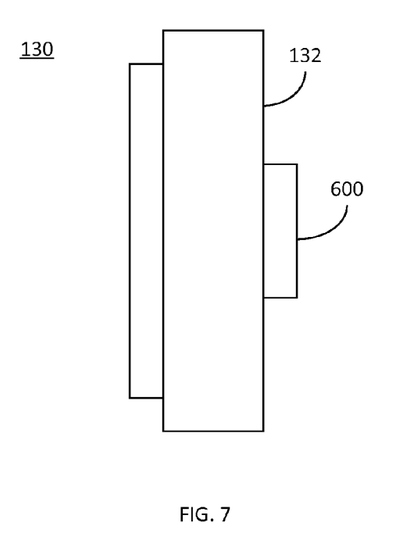
FIGS. 7 and 8 illustrate other exemplary fusible link cable harnesses in accordance with an embodiment.
Figure 8:
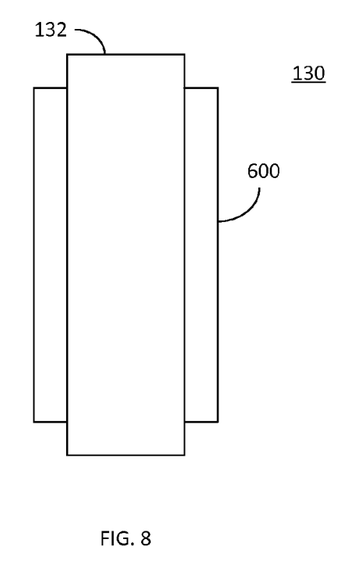

FIGS. 7 and 8 illustrate other exemplary fusible link cable harnesses 130 in accordance with an embodiment. In these embodiments, the fusible link cable harnesses 130 do not include an external cable 134. The fusible link cable harness 130 merely includes a connector housing 132 as discussed above and a secondary connector housing 600 coupled via an internal wiring (not illustrated). The secondary connector housing 600 may have fewer pins (e.g., a 9-pin D-sub connector) than the connector housing 132, as illustrated in FIG. 7, or may have the same pin out as the connector housing 132, as illustrated in FIG. 8. In either embodiment only a subset of the pins from the connector housing 132 may be coupled to the pins of the secondary connector housing 600. One advantage of these embodiments is that the same cable can be reused. In other words, rather than having to replace an entire 3-foot long cable when an LRU 110 is replaced or the technician wants to change the address of an existing LRU 110, the technician can merely change the fusible link cable harness 130 by attaching the existing cable to a different fusible link cable harness 130.

Figure 9:
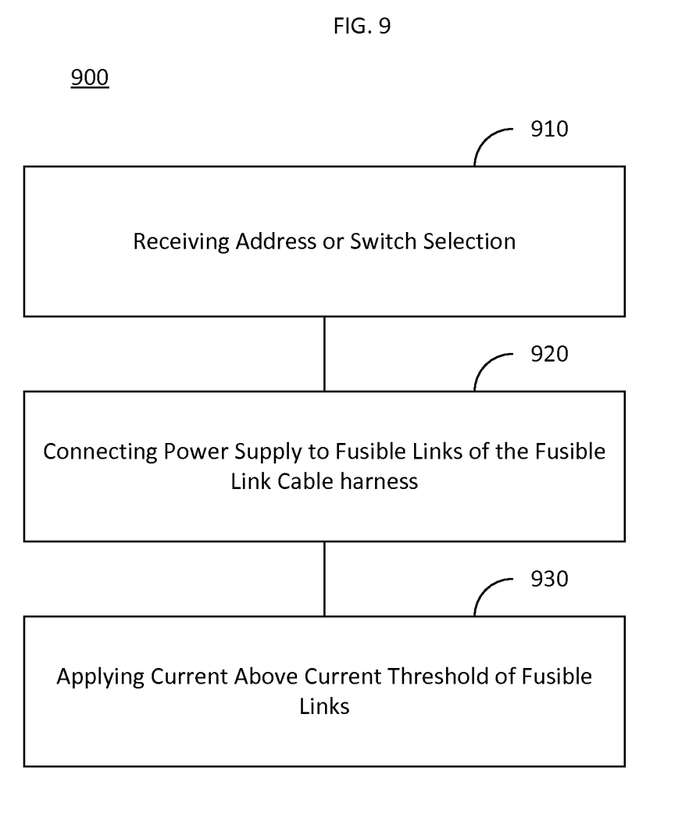
FIG. 9 is a flow chart describing a method for assigning an address to a fusible link cable harness, in accordance with an embodiment.

FIG. 9 is a flow chart describing a method 900 for assigning an address to a fusible link cable harness 130, in accordance with an embodiment. In the embodiment illustrated in FIG. 9, an address or switch selection is first received by an ID burning device 500. (Step 910). As discussed above, switches 530 of the ID burning device 500 could be manually controllable by a user and/or could be controlled by a controller 540. The controller 540 could receive an address or a switch selection via an input device 550. In embodiments where the controller 540 controls the switches 530, the method further includes connecting, by the controller, the power supply to fusible links 230 of a fusible link cable harness 130 to a power supply 520 by opening and/or closing the switches 530 corresponding to the selection of switches of the input address. (Step 920). The controller 540, or a user, then activates the power supply to apply the current above the threshold of the fusible links 230 to the selected switches to assign the address to a connected fusible link harness cable 130. (Step 930).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fusible link cable harnesses, comprising:
   a first connector having a plurality of pins, the plurality of pins comprising a main addressing pin and a plurality of secondary addressing pins; and
   a fusible link board, the fusible link board comprising:
      a bus coupled to the main addressing pin, and
      a plurality of fusible links, each of the plurality of fusible links coupled between one of the secondary addressing pins and the bus,
   wherein an address is assigned to the fusible link cable harnesses by applying a current to one or more of the plurality of secondary address pins to open one or more of the plurality of fusible links, and an electronic device coupled to a controller via the fusible link cable harnesses is addressable by the controller based upon the address assigned to the fusible link cable harnesses, the fusible link cable harness providing a data connection between the controller and the electronic device.

2. The fusible link cable harnesses according to claim 1, wherein the first connector is a twenty-five pin D-sub connector.

3. The fusible link cable harnesses according to claim 2, further comprising a second connector, wherein the second connector is a twenty-five pin D-sub connector and at least a subset of the plurality of pins of the first connector are coupled to pins of the second connector.

4. The fusible link cable harnesses according to claim 2, further comprising a second connector, wherein the second connector is a nine pin D-sub connector and at least a subset of the plurality of pins of the first connector are coupled to pins of the second connector.

5. The fusible link cable harnesses according to claim 1, wherein the bus is a trace on the fusible link board, the bus having a first thickness.

6. The fusible link cable harnesses according to claim 5, wherein each of the plurality of fusible links is a trace on the fusible link board, each of the plurality of fusible links having a second thickness, wherein the first thickness is greater than the second thickness.

7. The fusible link cable harnesses according to claim 6, wherein the second thickness is 0.5 millimeters.

8. The fusible link cable harnesses according to claim 6, wherein the second thickness is 0.25 millimeters.

9. The fusible link cable harnesses according to claim 5, wherein the first thickness is 2 millimeters.

10. The fusible link cable harnesses according to claim 1, wherein the first connector is a right angle connector.

11. The fusible link cable harnesses according to claim 1, wherein the fusible link board is a flexible printed circuit board.

* * * * *